Feb. 21, 1939.         W. H. CHURCHILL         2,147,943
MOLDING FASTENER AND INSTALLATION
Filed March 4, 1937

Inventor:
Wilmer H. Churchill,
by Walter S. Jones
Att'y.

Patented Feb. 21, 1939

2,147,943

UNITED STATES PATENT OFFICE 2,147,943

MOLDING FASTENER AND INSTALLATION

Wilmer H. Churchill, Saugus, Mass., assignor to United-Carr Fastener Corporation, Cambridge, Mass., a corporation of Massachusetts Application March 4, 1937, Serial No. 128,943

1 Claim. (Cl. 24—213)

The present invention relates to fasteners, and more particularly to molding fasteners adapted to secure a molding and the like to an apertured support, as for example, a sheet metal plate.

In the accompanying drawing which is illustrative of certain preferred embodiments of the invention, Fig. 1 is a plan view of an installation employing a fastener according to my invention, a portion of the molding being broken away to show the fastener in full lines;

Figure 1:
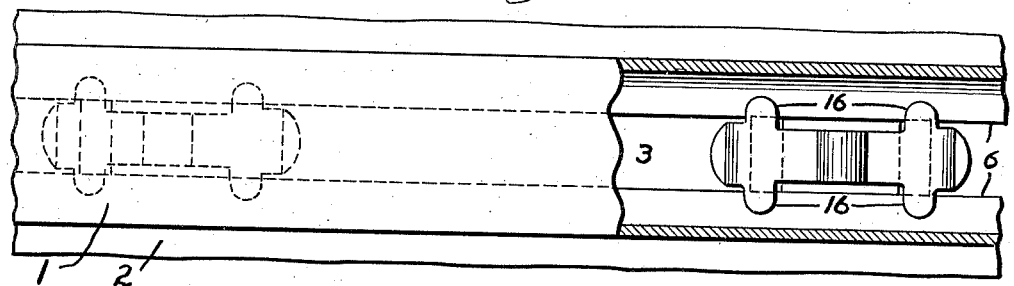

One of the major aims and advantages of the invention is the provision of a one-piece fastener of simple construction that may be readily and effectively used for attaching a member 1 to a support 2. The member 1 may be of any shape and construction and preferably is slotted as at 3, or it may be formed with an elongated aperture or plurality of apertures adapted to be aligned with a plurality of apertures 4 in the support 2. As herein illustrated, the member 1 may be in the form of a metal molding having an outer surface 5, which may be semi-circular or otherwise configurated, the sides of which terminate in spaced inturned flanges 6 defining between them the slot 3.

According to the invention, a fastener is provided adapted to be slid into the molding from one end, and placed in a position where it can be aligned with the pair of apertures 4 in the support 2 to which the molding or member 1 is to be attached.

The fastener advantageously may be formed from a single piece of metal, either of flat spring metal or of spring wire, to provide a two-part base 10 having a yielding connecting section 11 in the form of an intermediate U-shaped portion or loop. The extremities of the base 10 are formed with fastener legs 12 which, in the form shown in Figs. 2, 3 and 5, may extend downwardly and inwardly toward each other, as at 13, for a certain distance and then outwardly as at 14, presenting inwardly bowed fastener legs as shown. The outer extremity of the leg portion 14 is preferably offset from the innermost portion 15 connecting the portions 13 and 14, a distance greater than the width of the apertures 4 so as to prevent accidental removal of the fastener legs from the apertured support 2. Furthermore, the distance between opposed innermost portions connecting portions 13 and 14, is less than the spacing between the spaced apertures 4, as will be apparent.

When the fastener is to be used as a molding fastening, as for example as in the illustrated embodiment, the leg portions 12 are preferably of a width slightly less than the width of the slot or aperture 3 to permit the fastener to be readily slid into the molding from one end, and the base portion 10, or at least a part thereof, is preferably wider than the slot 3, to provide bearing portions acting against the flanges 6 or equivalent portion of the member 1. As herein illustrated the bearing portions may comprise laterally extending ears 16 on the base and preferably these portions 16 are arranged on opposite sides of the base and are disposed between the yielding connection section 1 and each of the legs 12.

Figure 4:
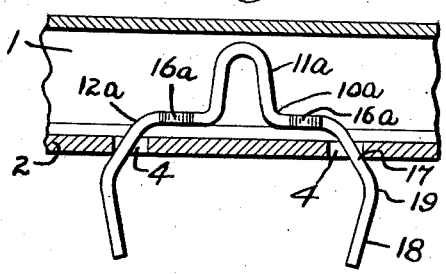
Fig. 4 is a view similar to Fig. 2, illustrating another form of fastener according to the invention.
Figure 5:
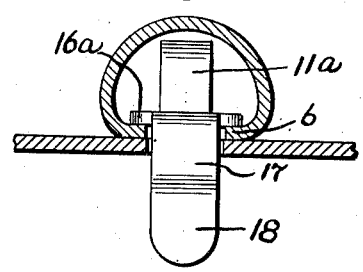
Fig. 5 is a transverse sectional view similar to Fig. 3, illustrating the fastener shown in Fig. 4.
Figure 6:
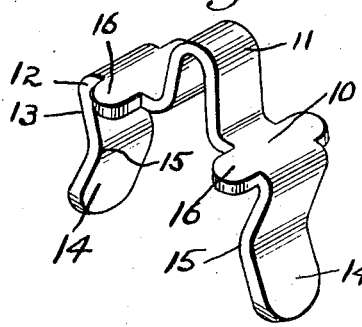
Fig. 6 is a perspective view of the fastener illustrated in Figs. 2 and 3.
Figure 7:
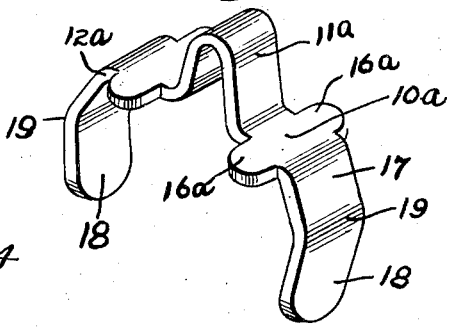
Fig. 7 is a perspective view of the fastener illustrated in Figs. 4 and 5.

The embodiment of the invention illustrated in Figs. 4, 5 and 7 is similar in many respects to the form described above, and comprises a base 10ª having spaced bearing portions 16ª and an intermediate yielding connecting portion 11ª. The fastener legs 12ª, however, may be outwardly bowed and formed of outwardly and downwardly extending portions 17 terminating in downwardly and inwardly extending portions 18. Preferably in this embodiment of the invention, the spacing between the portions 19 connecting the portions 17 and 18 is greater than the spacing between the apertures 5 to prevent accidental removal of the fastener lugs 12ª from the support 2.

From the above description it will be apparent that I have provided an extremely simple and efficient fastener for the purposes described. As will be obvious the fastener may be readily slid into a channel or molding and the like, and positioned therein with the fastener legs extending through the slot or base apertures thereof. The molding may thus be applied to its supporting member 2 by simple direct pressure to force the fastener legs through apertures 4, the yielding connecting portions 11 or 11ª permitting flexing of the fastener legs for this purpose, and further, due to the height and shape thereof, preventing displacement of the fastener in the molding.

Figure 2:
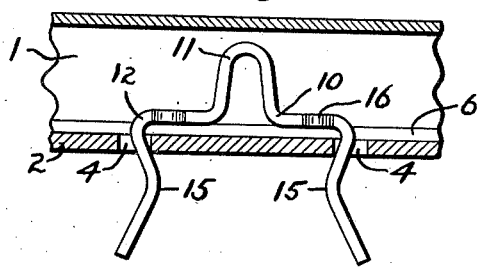
Fig. 2 is a longitudinal sectional view through the installation shown in Fig. 1, illustrating the application of one embodiment of the fastener.
Figure 3:
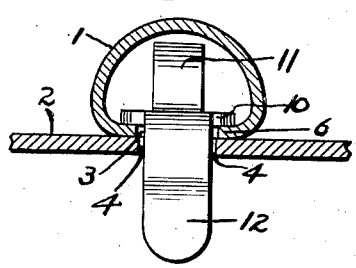
Fig. 3 is a transverse sectional view illustrating the fastener in end elevation.

When the fastener is applied to the support, as illustrated particularly in Figs. 2 and 4, the yielding connecting section 11 or 11ª acts to draw the opposed base portions and associated fastener legs toward each other, insuring a highly satisfactory fastening that may be applied and removed by a snap fastener action.

As will be apparent to those skilled in the art, the invention is not restricted in use to fasteners for attaching moldings and the like to supports, as other members of various description may be secured by means of the novel fastener. Furthermore, it is to be understood that the novel features of the fastener essential to the invention are not restricted to the specific details of construction as shown and described, as many departures are available within the scope of the invention, as defined in the appended claim.

I claim:

A snap fastener for hollow moldings and the like formed from a single strip of yieldable sheet metal, said fastener having a molding-engaging portion divided into two base portions connected by a yieldable loop portion extending normal to the plane of the base portions and a pair of legs extending from said molding-engaging portion, in a direction opposite to the loop portion, one leg from each base portion at its outer end and said legs facing each other flatwise and shaped to cooperate with each other by flatwise movement to snap into and out of engagement with a support, and said legs being of less width than the base portions at least near where they join the base portions.

WILMER H. CHURCHILL.